Dec. 11, 1945.    H. I. WOLFF    2,390,764
BUTADIENE RECOVERY
Filed June 27, 1944
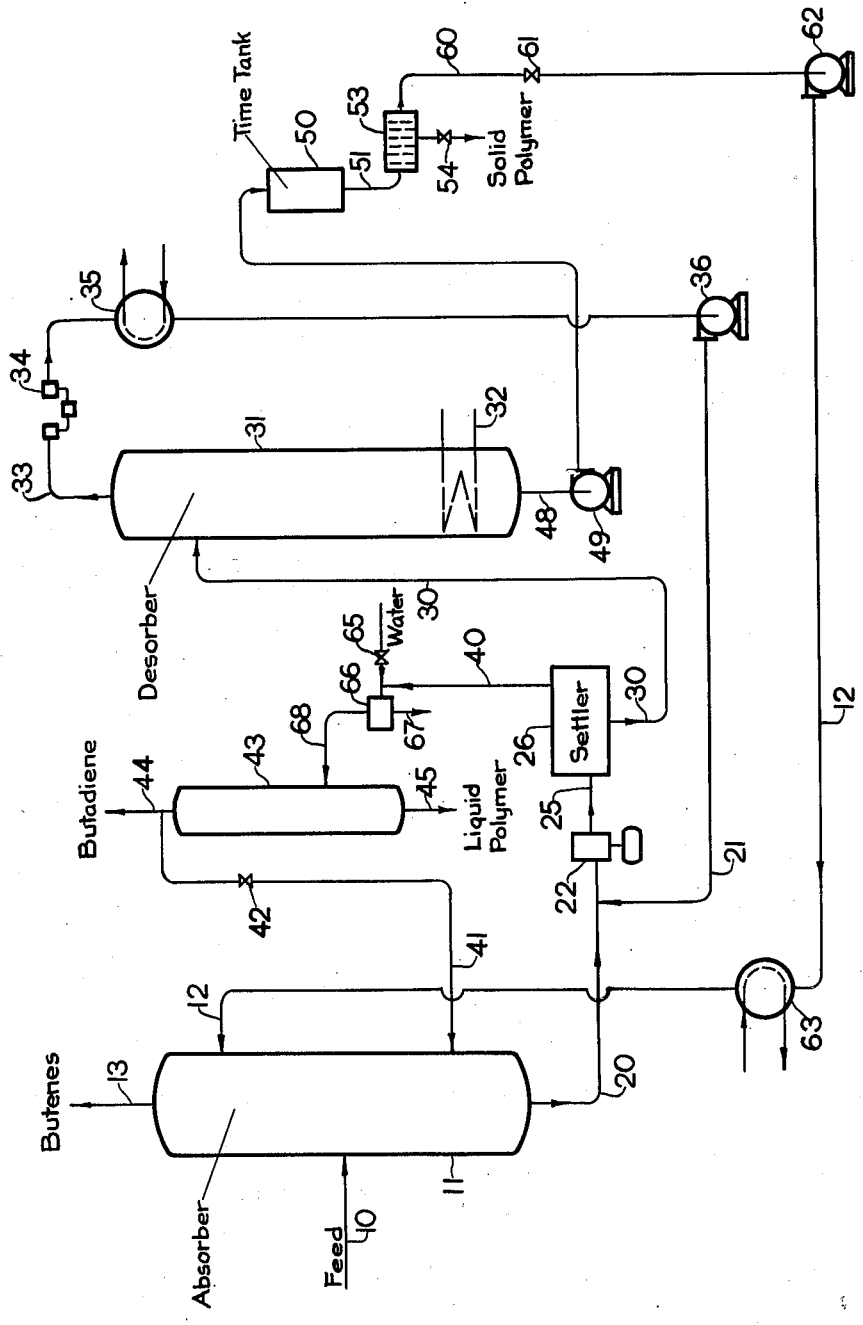
Inventor: Harold I. Wolff
By his Attorney:

Patented Dec. 11, 1945

2,390,764

UNITED STATES PATENT OFFICE 2,390,764

BUTADIENE RECOVERY

Harold I. Wolff, Los Angeles, Calif., assignor to Shell Development Company, San Francisco, Calif., a corporation of Delaware Application June 27, 1944, Serial No. 542,359

8 Claims. (Cl. 260—681.5)

The present invention relates to the production of butadiene and the like and pertains more particularly to improved methods of separating butadiene from mixtures containing butadiene along with butenes, acetylenes, etc., by selective adsorption in a selective solvent, especially in copper ammonium acetate solutions. The invention is primarily concerned with improved methods of removing acetylenes, particularly low-boiling acetylenes and like impurities from the product butadiene and the absorbing solvent.

Processes of producing butadiene are now in operation wherein butadiene is absorbed from mixtures containing it along with butenes, low-boiling acetylenes, etc., by contacting said mixtures with a selective solvent, the butenes being rejected by the absorbing solvent. The butadiene is then freed from the enriched selective solvent by heating in a desorbing zone. Then the substantially butadiene-free solvent is recycled to the butadiene absorbing zone. Acetylenes are usually present in small amounts and are also absorbed by selective solvents and tend to remain in the solvent throughout the step of butadiene desorption, thereby accumulating in the recirculation of the absorbing solvent. When the concentration of acetylenes such as methyl, ethyl and vinyl acetylenes in the absorbing solvent reaches a certain point, the acetylenes will be freed with butadiene in the desorbing zone, thereby contaminating the butadiene product. When the concentration of acetylenes in the butadiene product is above about 0.10% by weight, the butadiene product is unsatisfactory for polymerization with styrene and the like in the formation of synthetic rubber.

It is therefore, an object of this invention to provide an improved selective solvent absorption and purification method for the production of high quality butadiene from mixtures containing butadiene along with butenes, small amounts of acetylenes, particularly lower acetylenes and other impurities.

It is a special object of this invention to provide an improved method of purification of product butadiene and the absorption solvent in a butadiene extraction process.

It is a further object of the present invention to provide an improved and simplified process of removing acetylenes from the product butadiene and of preventing the accumulation of acetylene polymers in the aqueous extraction solvent of a butadiene extraction method.

The above and other objects of this invention will be readily apparent from the following description taken in reference to the drawing which represents a simplified schematic flow diagram of a butadiene extraction and purification system.

Briefly, the process of the present invention comprises the improvement in a butadiene extraction process of the steps of contacting a butadiene-enriched or "fat" selective solvent with liquid butadiene, removing the contacted fat solvent, which is substantially immiscible with said liquid butadiene, to a desorbing zone for removal of the butadiene, and passing said desorbed butadiene in a liquid state to said contacting step.

While the method of the present invention is especially advantageous when applied to butadiene extraction methods using aqueous solutions of copper ammonium acetate, $$[Cu(NH_3)_2OCOCH_3]$$

as the selective solvent and will be described by way of illustration and for the sake of simplicity with regard to such copper ammonium acetate solutions, aqueous solution of other ammonium metal salt complexes may also be used. Thus, there are included other soluble ammonium metal salt complexes and particularly the ammonium complexes of metal salts, the hydroxides of which metals are water-insoluble. Such metals, whose salts form water-soluble ammonium complexes, include, for example, copper, zinc, cobalt, platinum, chromium, nickel, silver, etc. Specific complex salts which may be used include, for example, copper ammonium formate, $[Cu(NH_3)_2OCOH]$, copper ammonium chloride $[Cu(NH_3)_2Cl]$, cupric ammonium sulfate $$[Cu(NH_3)_4SO_4]$$

zinc ammonium chloride $[Zn(NH_3)_4Cl_2]$, zinc ammonium sulfate $[Zn(NH_3)_4SO_4]$, cobaltic ammonium chloride $[Co(NH_3)_6Cl_3]$, cobaltous ammonium chloride $[Co(NH_3)_6Cl_2]$, platinous ammonium chloride $[Pt(NH_3)_2Cl_2]$, silver ammonium chloride $[Ag(NH_3)_2Cl]$, etc. Likewise, other selective solvents for butadiene which, when enriched with butadiene are relatively and, preferably substantialy, immiscible with liquid butadiene may be employed. For example, such other suitable selective solvents include sulfolane, sulfolanol, dimethyl sulfone, diethyl sulfone, aqueous acetone, aqueous acetonitrile, aqueous lacto-nitrile, nitromethane, etc.

More fully, the process of the present invention as applied to butadiene extraction with aqueous copper ammonium acetate solution comprises selectively absorbing butadiene as well as the minor amounts of lower acetylenes, such as methyl, ethyl, vinyl, etc., acetylenes, from a mixture containing these compounds along with butenes, etc., in said aqueous copper ammonium acetate solution, and rejecting the butenes as raffinate. Said enriched or fat aqueous solution of copper ammonium acetate and absorbed butadiene and acetylenes is contacted, such as by mixing, with a liquid consisting essentially of butadiene. Thereafter, the liquid butadiene and the aqueous solution are separated and the butadiene-enriched aqueous solution is subsequently desorbed to release substantially completely the butadiene therefrom. In this desorption small amounts of acetylenes, ammonia, and water are also vaporized and are contained in the liquid butadiene passing to the fat solvent-contacting step, wherein these impurities are removed from the butadiene by the solvent. The desorbed butadiene-free lean solution is preferably purified in order to minimize emulsion troubles. Such purification is preferably carried out by exposing the lean solution to conditions resulting in the polymerization of the acetylenes and filtering out the solid polymers formed thereby. The liquid polymers are removed from the aqueous solvent by the liquid butadiene in the above butadiene-contacting step and are subsequently separated, such as by distillation, from the product butadiene.

A suitable aqueous copper ammonium acetate solution generally comprises 9.5 to 11.5 molar (i. e. gram mols per liter) of ammonia, 3.0 to 3.3 molar total copper (including 0.2 to 0.4 molar cupric ion), and 3.5 to 4.5 molar acetate (calculated as acetic acid).

As has been indicated, the absorption of butadiene by aqueous copper ammonium acetate solution or other selective solvent may be from a hydrocarbon feed in the vapor or liquid state. In liquid phase absorption a series of stages may be used, each stage comprising a mixer and a settler or other staging device, such as discrete stage or tray contactors, the temperature increasing and the pressure gradually decreasing through said stages. For example, the first stage may be operated at 5–15° F. and 20–40 p. s. i., the penultimate stage may operate at 20–30° F. and 10–20 p. s. i., and the last stage acting as a liquid phase butene rejection or partitioning rectifier, may operate at 65–100° F. and 60–75 p. s. i. A suitable column or columns providing a large surface contact between descending liquid absorbing solution and rising hydrocarbon vapor is generally used in vapor phase absorption and may also be used in liquid phase absorption.

The butadiene-enriched copper ammonium acetate solution or fat solvent is contacted or intermingled with liquid butadiene in any suitable manner. For example, the contacting may be carried out by means of a mixer and settler or a countercurrent contacting column or similar device. Preferably, the fat solvent is contacted with liquid butadiene under conditions deterrent to further absorption of butadiene by the solvent. Generally, the contacting is carried out under the same temperature and pressure as that under which the fat solvent leaves the absorption zone. For example, when using a series of liquid-liquid absorption stages as in the example given above, the contacting step is carried out at 65–100° F. and 60–75 p. s. i.

The contacting step is carried out in such a manner as to yield two liquid layers, one of liquid butadiene and the other of aqueous copper ammonium acetate, which layers are separately withdrawn. The butadiene layer, containing acetylene polymers extracted from the aqueous solvent, passes preferably to a product purification zone, such as a distilling zone, wherein the acetylene polymers are removed and high purity butadiene is obtained.

The butadiene-rich solvent, containing additional acetylenes and ammonia extracted from the liquid butadiene, passes to a desorbing zone, wherein the butadiene is desorbed in any suitable manner, preferably however, at a relatively low pressure and under conditions described in copending application, Serial No. 528,145, filed March 25, 1944, which issued as Patent No. 2,383,784 on August 28, 1945. The desorbing zone may comprise a packed or plate column or columns having means for increasing the temperature of the solvent as it nears the end of its passage through the desorbing zone.

The butadiene-free lean solution leaving the desorbing zone is preferably purified before recycling to the absorbing zone. For example, the lean solution may be transferred from the desorbing to a polymerizing zone, wherein acetylenes, other polymerizable impurities and changeable materials are exposed to polymerization conditions of about 60–80 p. s. i. and 165–195° F. for 10 to 50 minutes. The time period desirable in the polymerization zone determines the size of the vessel used for this purpose and depends on the temperature employed and the amounts and types of acetylenes and other reactive impurities present. For example, when the feed to the absorbing zone contains 2.7% by weight of acetylenes, a time period of about 40 minutes at about 180° F. is found desirable. Thereafter, the solid polymers and other solid impurities are removed by filtering, such as, for example, in a Sweetland filter. The filtered lean solvent is then cooled and recycled to the absorbing zone.

Referring now to the drawing, a hydrocarbon feed mixture, such as a cracked C4 fraction containing butadiene, butenes and minor amounts of acetylenes, which are mainly methyl and ethyl acetylenes, is introduced either as vapor or liquid through line 10 into the middle of the absorber 11, and passes countercurrently to descending aqueous copper ammonium acetate solution, which is introduced near the top of the absorber 11 through line 12. The butenes and paraffins are not absorbed by the solution and pass out the top of the absorber 11 through line 13.

The butadiene and acetylenes present are absorbed in the aqueous copper ammonium acetate solution which passes out the bottom of the absorber 11 through line 20. The butadiene-saturated aqueous solution in line 20 together with liquid butadiene from line 21 flows into a mixer 22. The resulting mixture is then passed through line 25 to a settling tank 26, wherein separation into a layer of liquid butadiene and a layer of aqueous solvent takes place. The separated aqueous copper ammonium acetate solution is withdrawn from the bottom of the settler 26 and passes through line 30 into the upper portion of the desorber 31. Therein, butadiene is vaporized, usually at a relatively low pressure, i. e. preferably below 18 p. s. i. and especially at 10–12 p. s. i. by heating by means of a heating element 32 in the bottom portion of the desorber 31. The vaporized butadiene together with some lower acetylenes, water and ammonia passes out through top line 33, compressor 34, and condenser 35.

The butadiene is liquified in condenser 35 preferably at a temperature of 40° F. or lower. The condensed butadiene passes to pump 36 which forces it through line 21 to the previously mentioned mixer 22 and settler 26, wherein are formed two liquid layers, one of butadiene containing liquid acetylene polymers extracted from the fat solvent and the other of aqueous fat solvent containing most of the acetylenes, ammonia, and water extracted from the liquid butadiene.

From the top of the settler 26 the liquid butadiene layer substantially free from $NH_3$ is withdrawn through line 40. It is sometimes desirable to remove the small amount (generally less than .01%) of $NH_3$ from the contacted liquid butadiene layer by introducing into line 40 a small amount of water through a valved line 65, withdrawing a water layer in a separator 66 through bottom line 67 and then passing the washed butadiene through line 68 to the separation zone. This separation zone, to which flows the bulk or all of the butadiene from the settler 26, may comprise a distillation column 43, wherein high-purity butadiene is taken overhead through top line 44 and impurities, such as the liquid acetylene polymers are withdrawn through bottom line 45. After polymer removal part of the butadiene may be recycled as backwash through line 41 and valve 42 to the lower portion of the absorber 11.

From the desorber 31 the butadiene-free lean solution which contains absorbed acetylenes is withdrawn through bottom line 48 by means of a pump 49 and passes to a time tank 50 (or series of time tanks). There, the solution is held at a temperature of about 160-200° F., preferably about 180° F. under its own pressure (about 60–80 p. s. i.) for about 10–50 minutes. The exact length of time depends on the amount and nature of acetylenes present, sufficient time being provided to polymerize the acetylenes to liquid and solid polymers and thereby to prevent accumulation of acetylides in the copper solution.

The polymer-containing lean solution flows from the time tank 50 through line 51 to a filter 53, wherein the solid polymers and other solid impurities are removed from the solution. A valved line 54 is provided for periodic disposal of solid polymers, etc., which accumulate as filter cake in the filter 53. For continuous flow, a plurality of filters in parallel with accompanying lines and valves adapted for shutting off one or more of the filters are used. A solid adsorbent, activated charcoal, aluminum silicate, etc., may also be used to aid in removing the polymers.

The solid-free lean solution then passes from the filter 53 through line 60 and valve 61 to pump 62 which returns the aqueous lean solvent through cooler 63 and line 12 to the absorber 11 for further absorption of butadiene.

By means of the improved method of the present invention, there is obtained a higher yield of butadiene of higher purity and especially of decreased acetylene content. Besides being a superior solvent for acetylene polymers, butadiene in the present process attains other advantages not attainable with other agents or flow arrangements. Thus, by mixing the liquid butadiene with aqueous solvent, most of the residual $NH_3$ in the liquid butadiene is removed by the aqueous solvent. Thus, very little $NH_3$ remains in the product butadiene and this amount may be removed, if necessary with a very small amount of water. A large and separate system for recovery of $NH_3$ from the large volume of wash water heretofore obtained is not required with the present process.

Also, the equilibrium of acetylenes, especially of the lower acetylenes is more favorable to the aqueous copper ammonium acetate solution in the liquid-liquid contact of the liquid butadiene with aqueous solution in the contacting zone than in the vapor-liquid contact of the butadiene vapor with aqueous solution in the desorbing zone. In fact, the equilibrium in the liquid-liquid contacting zone is 2 to 3 times more favorable than in the vapor-liquid mixture in the desorber. Thus, the acetylenes tend to build up in the aqueous copper ammonium acetate solution, which tendency forces the acetylenes to pass out the bottom of the desorber with the spent aqueous solution. The acetylenes are thereafter removed from the lean solution by polymerization in the purification system.

In the application of the process of the present invention to a hydrocarbon feed having an acetylene content of about 1.0% by weight and when the desorbed lean solution of copper ammonium acetate is held for 30 minutes at 180° F. in the polymerizing time tank 50, the liquid butadiene flowing through line 21 to the mixer 22 contains .020% by weight of acetylenes and about 1.5% by weight of 70% aqueous $NH_3$, while the fat aqueous copper ammonium acetate flowing through line 20 to the mixer 22 contains about 0.10% by weight of liquid acetylene polymers. After the contacting step and separation of the two liquid layers the butadiene layer contains about 0.5% by weight of liquid polymers, less than .01% by weight of $NH_3$ and less than 0.005% acetylenes. The polymer content of the aqueous copper ammonium acetate solution decreases through the contacting step to about 0.08% by weight. The liquid polymers dissolved in the liquid butadiene are removed in the distillation column, from which high purity butadiene product containing less than 0.005% acetylenes is taken overhead.

I claim as my invention:

1. The process of separating butadiene from a hydrocarbon mixture containing it together with other hydrocarbons, including small amounts of acetylenes, comprising the step of absorbing butadiene from said mixture in a selective solvent having a greater solvent power for acetylenes than liquid butadiene has, contacting the butadiene-enriched solvent with liquid butadiene produced in the process and containing small amounts of acetylenes under conditions to form two liquid layers, one essentially butadiene of decreased acetylene content and the other of butadiene-enriched solvent, separating said liquid layers, subsequently desorbing butadiene from the contacted rich solvent, and passing said desorbed butadiene in a liquid state to said contacting step.

2. In a butadiene recovery process, the improvement comprising the steps of treating a selective solvent enriched with butadiene and a small amount of acetylenes by contacting it with a liquid consisting essentially of butadiene together with small amounts of acetylenes under conditions deterrent to further absorbtion of butadiene by said solvent and to form two liquid layers, one essentially butadiene of decreased acetylene content and the other of butadiene-enriched solvent, said solvent having a greater solvent power for acetylenes than liquid butadiene has, separating said liquid layers, desorbing the butadiene from said contacted butadiene-enriched solvent, and passing the desorbed butadiene in liquid state to said contacting step.

3. The process of separating butadiene from a hydrocarbon mixture containing it together with other hydrocarbons, including small amounts of acetylenes, comprising the step of absorbing butadiene from said mixture in a selective solvent having a greater solvent power for acetylenes than liquid butadiene has, said solvent when enriched with butadiene being substantially immiscible with liquid butadiene, contacting said butadiene-enriched solvent with liquid butadiene produced in the process and containing small amounts of acetylenes under conditions to form two liquid layers, one essentially butadiene of decreased acetylene content and the other of butadiene-enriched solvent, separating said liquid layers, subsequently desorbing butadient from said contacted rich solvent, and passing said desorbed butadiene in a liquid state to said contacting step.

4. The process of claim 1, wherein the selective solvent is an aqueous solution of an ammonium metal salt complex.

5. The process of separating butadiene from a hydrocarbon mixture containing it together with other hydrocarbons, including small amounts of acetylenes, comprising the step of absorbing butadiene from said mixture in an aqueous selective solvent having a greater solvent power for acetylenes than liquid butadiene has, contacting said butadiene-enriched solvent with liquid butadiene produced in the process and containing small amounts of acetylenes, whereby the acetylene content in said liquid butadiene is decreased, subsequently desorbing butadiene from said contacted rich solvent, passing said desorbed butadiene in a liquid state to said contacting step, and distilling said liquid butadiene after said contacting step to obtain butadiene of high purity.

6. A butadiene recovery process comprising the steps of treating a selective solvent enriched with butadiene and a small amount of liquid acetylene polymers by contacting it with a liquid consisting essentially of butadiene together with small amounts of acetylenes, said treating being carried out under conditions to form two liquid layers, one essentially butadiene of decreased acetylene content and the other of butadiene-enriched solvent, said solvent having a greater solvent power for acetylene than liquid butadiene has, separating said liquid layers, desorbing the butadiene from said contacted butadiene-rich solvent, passing the desorbed butadiene in a liquid state to said contacting step, and treating said liquid butadiene subsequent to said contacting step to remove liquid polymers contained in said butadiene.

7. An improved copper ammonium acetate absorption and purification method for separating butadiene from a hydrocarbon mixture containing it together with butenes and small amounts of acetylenes comprising the steps of intermingling said mixture in an absorbing zone with an aqueous solution of copper ammonium acetate to obtain a rich solution containing butadiene and acetylenes, said copper ammonium acetate solution having a greater solvent power for acetylenes than liquid butadiene has, contacting said rich solution with a liquid consisting essentially of butadiene together with small amounts of acetylenes without substantially changing the conditions of temperature and pressure on the rich solution leaving the absorbing zone, said contacting being carried out under conditions to form two liquid layers, one of liquid butadiene of decreased acetylene content and the other of butadiene-enriched aqueous copper ammonium acetate solution, separating said liquid layers, desorbing the butadiene from said contacted butadiene-enriched solution, passing the desorbed butadiene in a liquid state to said contacting step, and fractionating said liquid butadiene subsequent to said contacting step to remove heavy impurities.

8. An improved copper ammonium acetate absorption and purification method for separating butadiene from a hydrocarbon mixture containing it together with butenes and small amounts of acetylenes, comprising the steps of intermingling said mixture with a solution of copper ammonium acetate to obtain a rich solution containing butadiene and acetylenes, said copper ammonium acetate solution having a greater solvent power for acetylenes than liquid butadiene has, mixing said rich solution with a liquid consisting essentially of butadiene together with small amounts of acetylenes under conditions deterrent to further absorption of butadiene by said solution, separating said mixture into a layer of liquid butadiene of decreased acetylene content and an aqueous layer of butadiene-enriched copper ammonium acetate solution, desorbing butadiene from said aqueous layer of rich solution at a relatively low pressure, condensing said vaporized desorbed butadiene, passing said liquid butadiene to said mixing step, exposing the desorbed butadiene-free aqueous solution of copper ammonium acetate and small amounts of acetylenes to conditions causing polymerization of said acetylenes to solid and liquid polymers, removing solid polymers from said exposed solution, and returning said solid-free solution to said intermingling step.

HAROLD I. WOLFF.